US008857625B1

(12) United States Patent
Oropeza

(10) Patent No.: US 8,857,625 B1
(45) Date of Patent: Oct. 14, 2014

(54) WEIGHING AND SORTING SYSTEM AND METHOD

(71) Applicant: Jesus R. Oropeza, Yuma, AZ (US)

(72) Inventor: Jesus R. Oropeza, Yuma, AZ (US)

( * ) Notice: Subject to any disclaimer, the term of this patent is extended or adjusted under 35 U.S.C. 154(b) by 0 days.

(21) Appl. No.: 13/907,731

(22) Filed: May 31, 2013

(51) Int. Cl.
*B65G 47/38* (2006.01)
*B07B 13/04* (2006.01)
*B07B 13/08* (2006.01)

(52) U.S. Cl.
CPC ............ *B07B 13/04* (2013.01); *B07B 13/08* (2013.01); *B65G 47/38* (2013.01)
USPC ...................................... 209/698; 198/370.03

(58) Field of Classification Search
USPC ................. 198/370.03–370.05; 209/698
See application file for complete search history.

(56) References Cited

U.S. PATENT DOCUMENTS

| | | | |
|---|---|---|---|
| 3,360,106 A | 12/1967 | Harrison et al. | |
| 3,895,982 A * | 7/1975 | Persson | 156/71 |
| 4,399,904 A * | 8/1983 | Canziani | 198/370.04 |
| 4,586,613 A * | 5/1986 | Horii | 209/556 |
| 4,722,430 A | 2/1988 | Canziani | |
| 5,285,884 A * | 2/1994 | Polling et al. | 198/370.04 |
| 5,331,118 A * | 7/1994 | Jensen | 177/25.14 |
| 5,377,819 A * | 1/1995 | Horton et al. | 198/853 |
| 5,651,446 A | 7/1997 | Affeldt et al. | |
| 5,662,206 A * | 9/1997 | Baum et al. | 198/370.04 |
| 5,676,514 A | 10/1997 | Higman et al. | |
| 5,839,566 A | 11/1998 | Bonnet | |
| 6,082,522 A * | 7/2000 | Polling | 198/370.04 |
| 6,323,452 B1 * | 11/2001 | Bonnet | 209/583 |
| 6,712,194 B1 | 3/2004 | Abildgaard et al. | |
| 7,004,330 B1 | 2/2006 | Tew et al. | |
| 7,004,331 B2 | 2/2006 | Tew et al. | |
| 7,284,654 B2 | 10/2007 | Affaticati et al. | |
| 7,337,892 B2 * | 3/2008 | Groot et al. | 198/370.04 |
| 7,775,373 B2 | 8/2010 | Grundtvig et al. | |
| 7,891,479 B2 | 2/2011 | Evangelista et al. | |
| 8,381,897 B2 | 2/2013 | Brunsen et al. | |
| 2004/0069593 A1 * | 4/2004 | Heitplatz | 198/370.04 |

FOREIGN PATENT DOCUMENTS

JP 02221016 9/1990

OTHER PUBLICATIONS

"Dual-Direction Discharge Conveyor", 2012, retrieved from http://www.cisco-eagle.com/catalog/c-4220-dual-direction-tilting-discharge-belt-conveyor.aspx.

* cited by examiner

*Primary Examiner* — Joseph C Rodriguez
(74) *Attorney, Agent, or Firm* — Snell & Wilmer L.L.P.

(57) ABSTRACT

A sorting system configured to sort materials by size, and/or weight is disclosed herein. The sorting system is configured to operate in a smaller footprint as compared with conventional sorting systems. For instance, a main sorting track of sorting system is configured to deliver sorted material to either side of the main sorting track. Additionally, the sorting system is configured to reduce mechanical damage imparted on the material to be sorted by sorting system by a sliding and/or rolled delivery. Aspects of the sorting system may be mounted on a mobile platform.

17 Claims, 10 Drawing Sheets

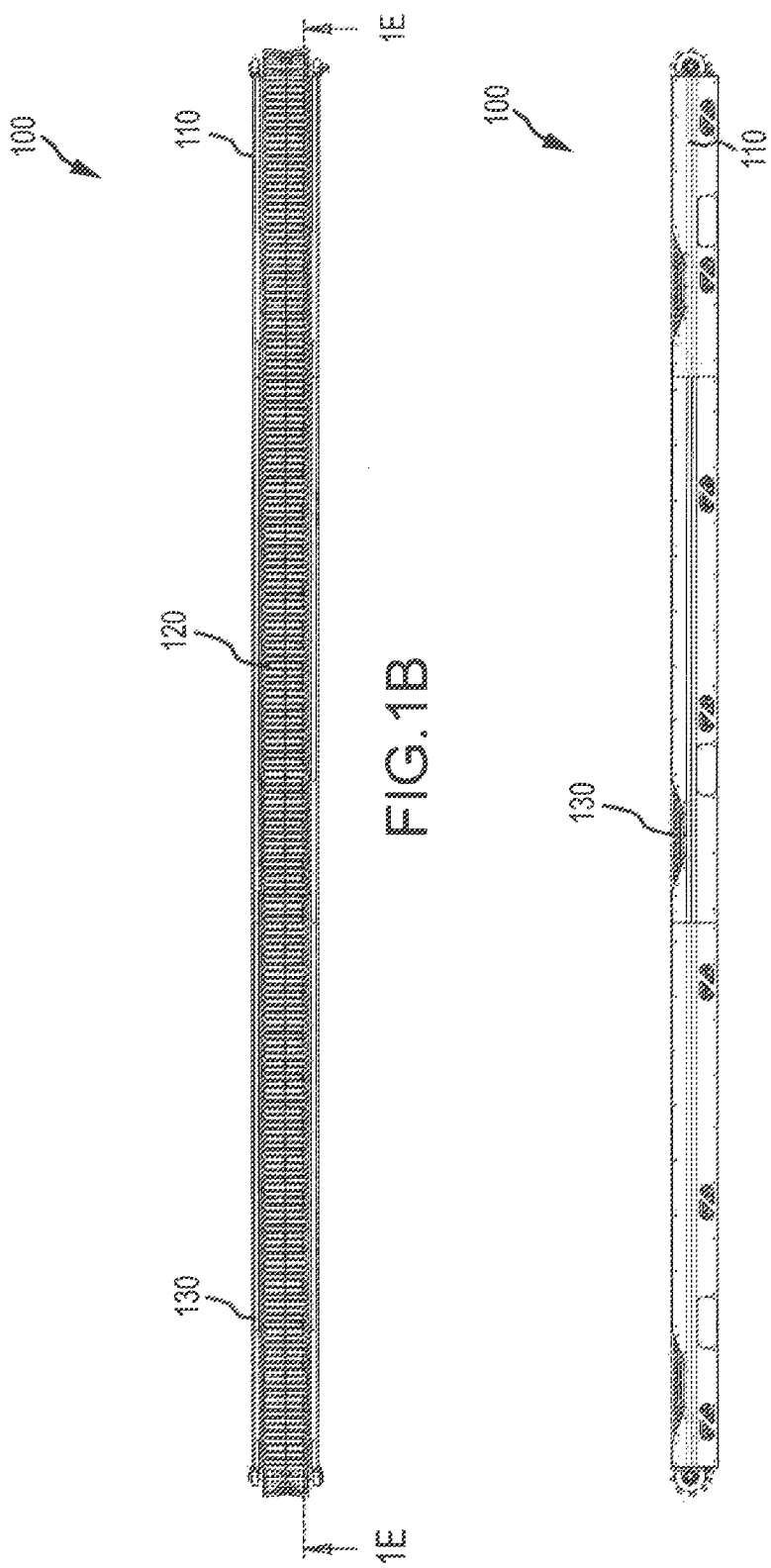

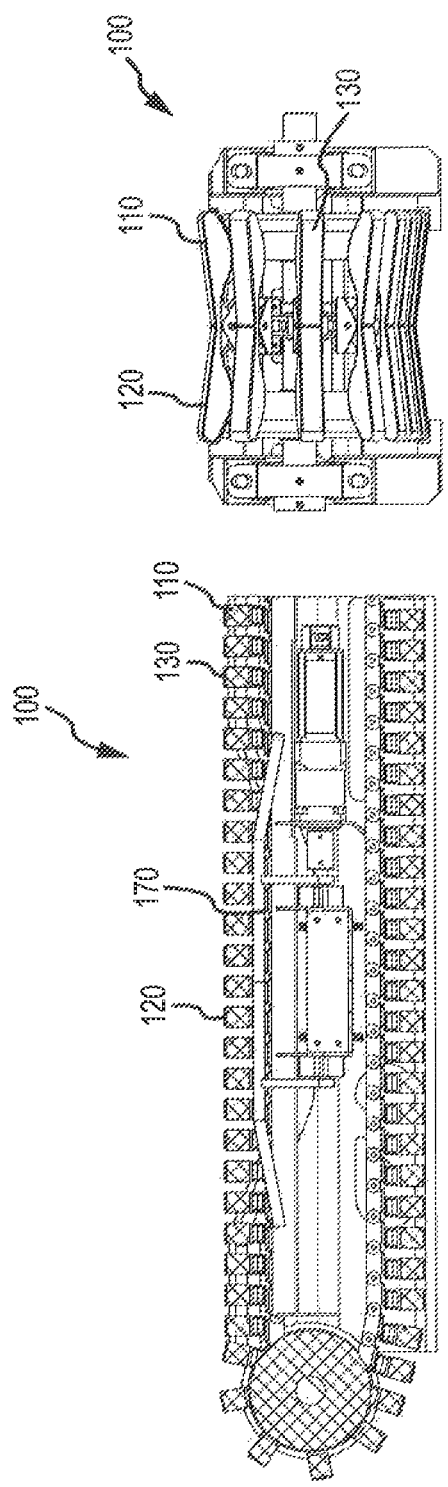
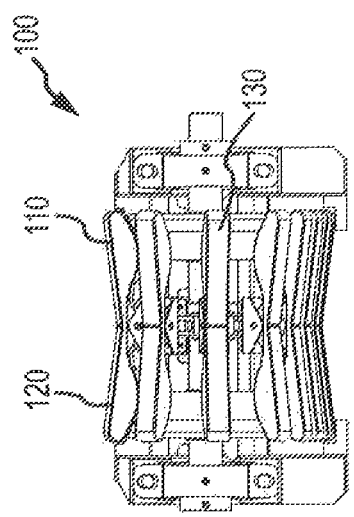
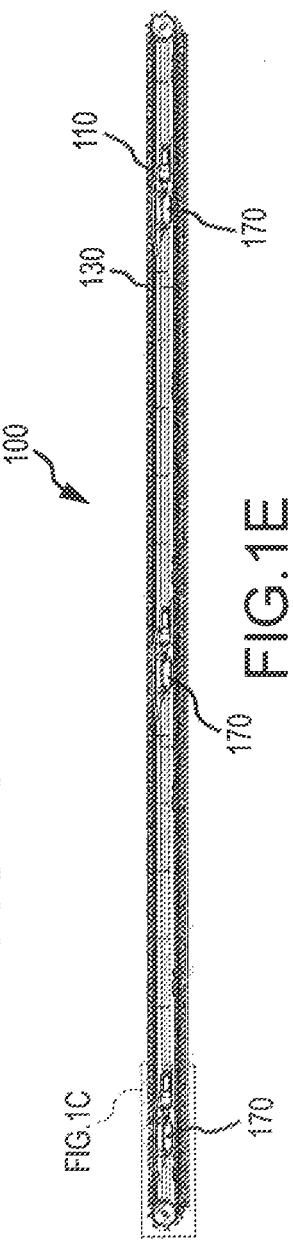
FIG. 1C
FIG. 1D
FIG. 1E

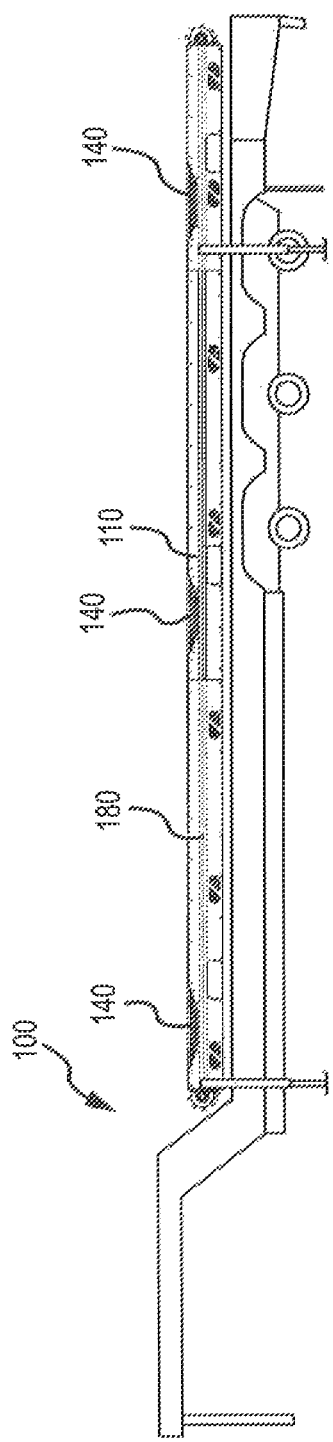
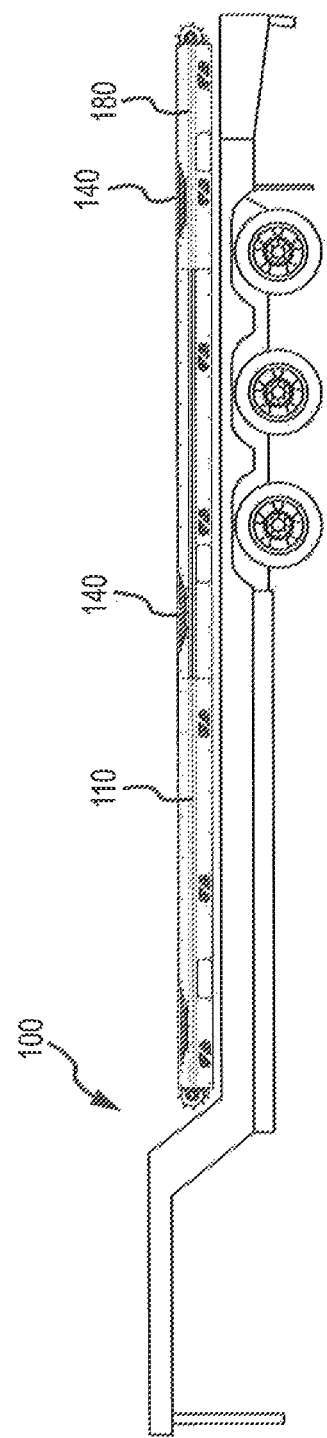
FIG.7A
FIG.7B

WEIGHING AND SORTING SYSTEM AND METHOD

FIELD OF INVENTION

The present disclosure generally relates to weighing, sizing and sorting apparatus and their operation. In particular, the present disclosure relates to a system configured to reduce mechanical damage to sorted materials.

BACKGROUND OF THE INVENTION

Sorting systems may utilize belt driven conveyors to deliver material from one location to another. Often times, materials to be sorted via these apparatus are ejected or removed from the conveyor by rams positioned on either side of the belt. Each ram may eject material in one direction. The force of these rams acting on the generally moving materials may damage the materials. For instance, the forces on these materials may cause bruising, as the case when the material comprises fruits and/or vegetables, decreasing their value. Also, the generally rough landing of the materials as they transition from the moving belt to a secondary location may also damage the materials. It would be advantageous to have a system where a premium is placed on both protecting the materials to be sorted from incurring mechanical damage and efficient sorting.

Also, the layout of traditional sorting systems is not ideal. Long spans of belt driven conveyors are used and as materials are generally only expelled from the conveyor to one side of the conveyors space may be wasted. As a result, the location of these traditional sorting systems is limited to those locations which can accommodate the long conveyor span. In the alternative, a short span with limited functionality may be employed.

The subject matter claimed herein is not limited to embodiments that solve any disadvantages or that operate only in environments such as those described above. Rather, this background is only provided to illustrate one exemplary technology area where some embodiments described herein may be practiced.

SUMMARY OF THE INVENTION

The present disclosure relates to an improved system and apparatus designed to address, among other things, the aforementioned deficiencies in prior art devices. In general, exemplary embodiments may relate to a weighing, sizing and sorting apparatus that is highly portable, maximizes its footprint, and is configured to sort materials with low instances of introducing mechanical damage to the sorted material.

Moreover, and unlike conventional devices, the sorting system described herein, may deliver material to either side of a main sorting track. According to various embodiments, the sorting system described herein does not utilize trays or carriages to support material to be sorted. Instead, according to various embodiments, the sorting system includes hinged members working in tandem advantageously configured to deliver sorted material to either side of a main sorting track. According to various embodiments, each hinged member of the main sorting track may be configured to deliver sorted material to either side of a main sorting track. Moreover, unlike traditional sorting systems than may rely on complicated motors or electronics embedded in and/or coupled to each sorting tray as they move about the system, the hinged members of the main sorting track are passive and alter their positioning in response to movement and/or guidance from one or more guide rails.

According to various embodiments, the sorting system described herein may comprise a flanking conveyor belt proximate to and/or adjacent to the main sorting track. The sorting system may be configured to deliver sorted materials from the main sorting track to the flanking conveyor belt. The flanking conveyor belt may be configured to operate in a direction that is different from the operational direction of the main sorting track. This operational configuration may slow the movement of the delivered sorted materials and/or reduce mechanical damage of material delivered to the flanking conveyor belt. Also, the operational direction of the flanking belts may maximize the footprint of the sorting system. For instance, areas previously unable to be used, such as areas adjacent to where material is first introduced to the main sorting track are available for use.

According to various embodiments, the sorting system described herein may be portable. Elements of the sorting system may be permanently mounted on a mobile platform. Any aspect of the sorting system described herein may be mounted for operation on a mobile platform. For instance, the main sorting track and/or one or more flanking conveyor belts may be mounted on a mobile platform configured to be hauled by a vehicle, such as a trailer being pulled by a tractor or truck.

According to various embodiments, the sorting system may comprise a delivery conveyor belt configured to deliver material to the main sorting track and/or a weighing and sizing sensor. The delivery conveyor belt may comprise designated targets for placement of materials to be sorted. The target may include raised structures to retain materials within a perimeter of the target. These targets may at least address overloading the sorting system and pace workers placing materials to be sorted on the delivery conveyor belt.

BRIEF DESCRIPTION OF THE DRAWINGS

The subject matter of the present disclosure is particularly pointed out and distinctly claimed in the concluding portion of the specification. A more complete understanding of the present invention, however, may best be obtained by referring to the detailed description and to the claims when considered in connection with the drawing figures, wherein like numerals denote like elements and wherein:

FIG. 1A depicts a top view of an exemplary embodiment of a main sorting track of the sorting system;

FIG. 1B depicts a side view of the main sorting track of FIG. 1A according to an exemplary embodiment;

FIG. 1C depicts an enlarged view of a portion a main sorting track in accordance with an exemplary embodiment of the sorting system;

FIG. 1D depicts an enlarged front view of a main sorting track in accordance with an exemplary embodiment;

FIG. 1E depicts a view of a main sorting track, from which the aspect of FIG. 1C is extracted, in accordance with an exemplary embodiment;

FIG. 7A depicts a side view of a stationary mobile platform mounted sorting system in accordance with various embodiments; and FIG. 7B depicts a side view of the mobile platform mounted sorting system of FIG. 7A configured for movement, in accordance with various embodiments.

DETAILED DESCRIPTION

Figure 5A:
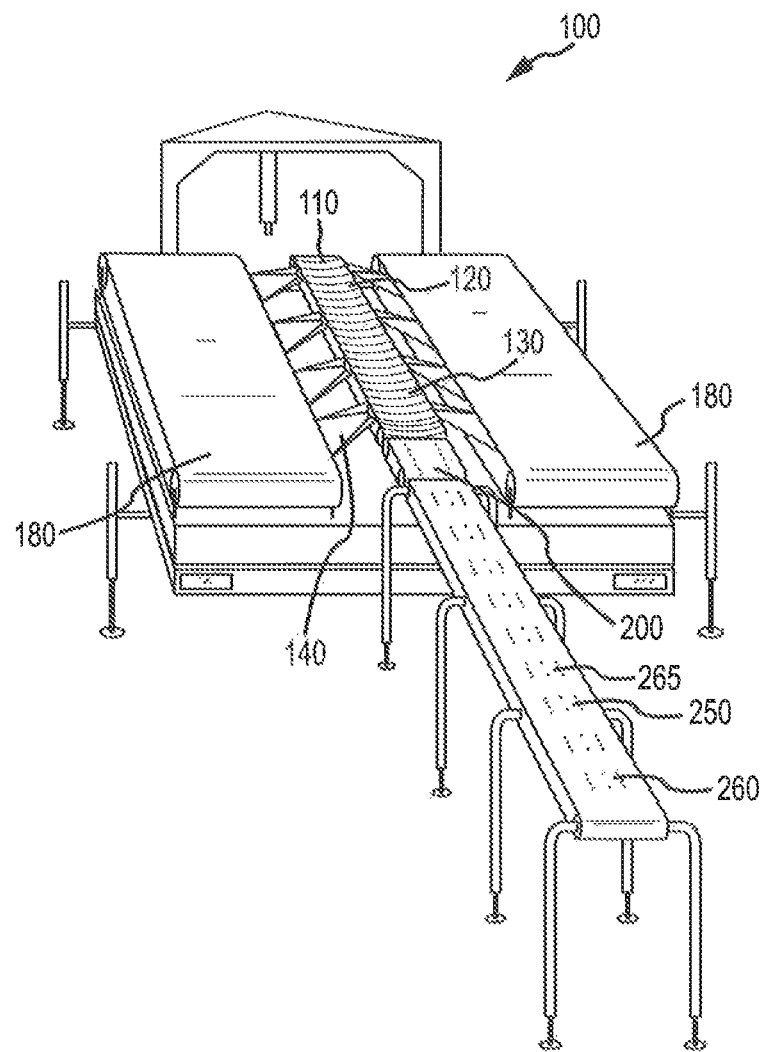
FIG. 5A depicts a sorting system comprising a main sorting track, a pair of flanking conveyor belts, a weighing belt, and a delivery belt in accordance with various embodiments.

According to various exemplary embodiments and with momentary reference to FIG. 5A, a sorting system 100 is disclosed herein. Sorting system 100 is configured to sort materials by size and/or weight. These materials may be any materials, however, according to various embodiments the sorted materials are grown items, such as fruits, vegetables, roots, and/or nuts.

Sorting system 100 is configured to operate in a smaller footprint as compared with conventional sorting systems. For instance, a main sorting track 110 of sorting system 100 is configured to deliver sorted material to either side of main sorting track 110. Additionally, sorting system 100 is configured to reduce mechanical damage imparted on the material to be sorted by sorting system 100. For instance, aspects of main sorting track 110 may pivot on an angle to deliver sorted material from main sorting track 110 down a delivery ramp to a secondary location. This rolling and/or sliding delivery of sorted material from main sorting track 110 may introduce less damage than other delivery systems that contact the material and push or pull the material to a secondary location (e.g. off of a main sorting track 100). According to various exemplary embodiments, and as further described below, sorting system 100 utilizes gravity to deliver at a pre-set pace, such as gradual, sorted material to a secondary location.

The secondary location may be to a portion of a flanking conveyer belt 180. Flanking conveyor belt 180 may operate in an opposite direction than main sorting track 110 to reduce the speed of delivered material and/or direct the delivered sorted material to a convenient location. This convenient location may be where a worker is standing. In this way, a worker need not move from his position to collect materials sorted to be of a desired weight and/or size. The worker may conveniently box and/or package the sorted materials from this location. The speed reduction due to the different operational direction of the flanking conveyer belt 180 may reduce the force of impact of delivered material and result in less mechanical damage to the sorted material.

According to various embodiments, sorting system 100 comprises a main sorting track 110.

With reference to FIGS. 1A-1E, main sorting track 100 may comprise a plurality of hinged members 130. Hinged members 130 may comprise a slight gap between adjacent hinged members 130. This gap may be any size, but in various embodiments, as depicted in FIGS. 1A-1E, the width of this gap is between approximately ½ and ⅓ the width of each hinged member 130. Each hinged member 130 may be any desired width, but as depicted in FIGS. 1A-1E hinged members 130 is approximately 1/10 as wide as it is long (its length being measured from distal end 135 to distal end 133).

According to various exemplary embodiments, hinged member 130 comprises a top surface 120 for receiving/transporting material. A plurality of top surfaces 120 working in concert may support material to be delivered.

Top surface 120 and/or hinged member 130 may be any suitable shape. According to various exemplary embodiments, top surface 120, which may be a continuous top surface 120 of hinged member 130, comprises a generally elongated "V" shape. Thus, when viewed in profile, such as with reference to FIGS. 2A and 2B, the distal ends 133, 135 of hinged member 130 may be higher than the center 131 of hinged member 130. In this way, material to be delivered may be gravity biased to the center 131 of at least one hinged member 130. Stated another way, as main sorting track 110 delivers material along the side of main sorting track 110, the material may, in general, be oriented towards the center 131 of one or more hinged members 130.

As noted above, top surface 120 may comprise surface features for retaining material. These same surface features may assist in the delivery of material to a secondary location. For instance, hinged member 130 may be generally flat from each distal end 133, 135 to the center 131 of top surface 120. In this way, material placed on hinged member 130 at any location may, via gravity and the sloped opposing surfaces, be directed towards the center 131 of each hinged member 130. Also, based on this design, material positioned near the center 131 of one or more hinged member 130, upon reaching a delivery destination, may roll off hinged member 130 when directed 130 without encountering obstacles. In this way, material may experience a gradual roll from the center 131 of hinged member 130 over a substantially flat surface to an angled tray 140, and/or a secondary location. Thus, the rolling/sliding action of sorting system 100 does not damage the material on sorting/delivery.

Figure 2A:
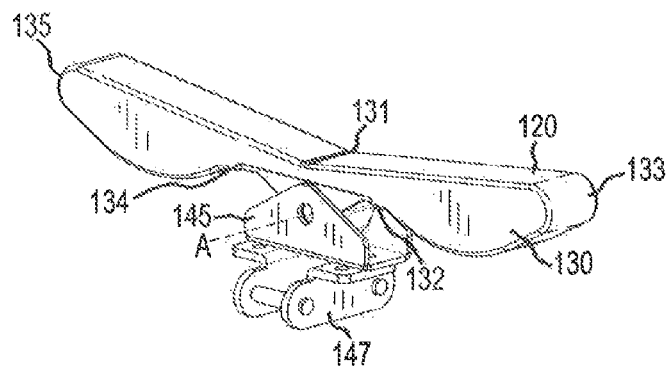
FIG. 2A depicts a hinged member and retaining structure of main sorting track in accordance with various embodiments.
Figure 2B:
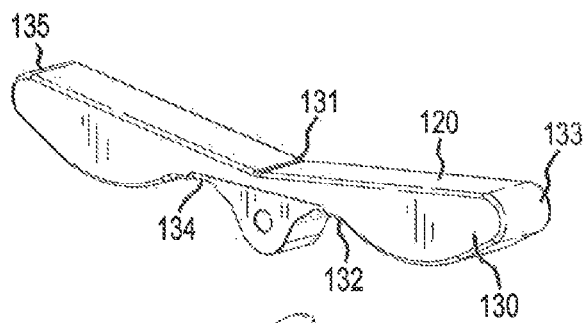
FIG. 2B depicts an exploded view of the hinged member of FIG. 2A.
Figure 2B:
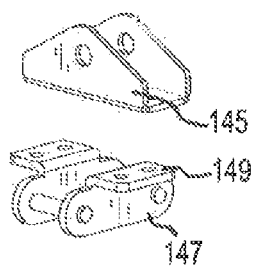

According to various exemplary embodiments and with further reference to FIGS. 2A and 2B, hinged member 130 may comprise a generally flat front and back face. Hinged member 130 may comprise indentations 132 and 134 to increase the range of motion of hinged member 130, such as a range of motion about axis A (See FIG. 2A). Hinged member 130 may comprise generally continuously sloped bottom surfaces between indentations 132, 134 and distal ends 133, 135 to assist the path of travel of hinged member 130 across stationary guide rails (not shown) and/or a pivoting guide track system 170.

Hinged member 130 may be coupled to a pivot structure 145. According to various embodiments, hinged member 130 may be coupled to a pivot structure 145 at single pivot location to passively pivot on an axis, such as axis A. This single pivot location may be integral to hinged member 130. Stated another way, a single formed piece may comprise a surface for transporting materials and a single pivot location through which axis A runs. According to various embodiments, hinged member 130 may be coupled to a pivot structure 145 at single pivot location by a single pivot axel on axis A. Axis A may be centered and held constant along the path of travel of main sorting track 110 (while hinged members 130 are on top of belt of main sorting track 110). Pivot structure 145 may be coupled to an anchor chain 147 on anchoring surface 149. According to various embodiments, pivot structure 145 is integral to anchor chain 147. Anchor chain 147 may be coupled to an adjacent anchor chain 147, such as via a chain link, to form a substantially continuous drive belt. This drive belt may be driven by a motor and advance main sorting track 110 in either direction. According to various embodiments, though depicted as separate units, hinged member 130, pivot structure 145 and anchor chain 147 may be integrally formed so long as hinged member 130 may pivot along pivot axis A.

Figure 3A:
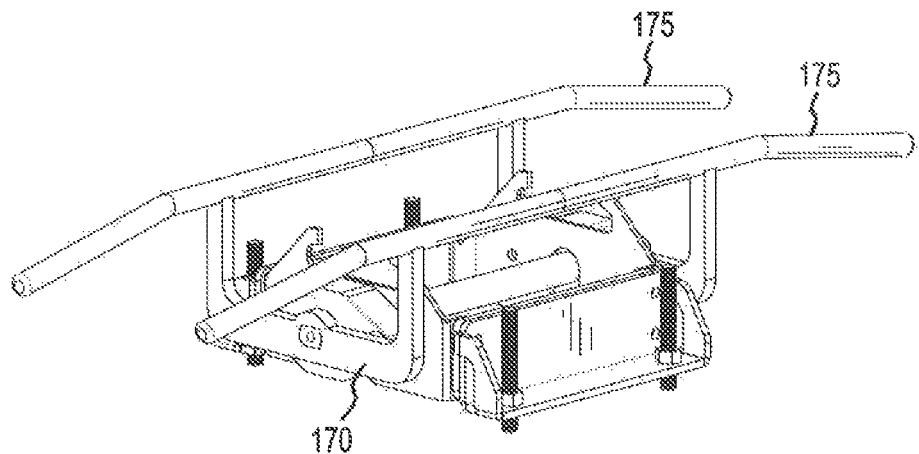
FIG. 3A depicts profile view of a pivoting guide track assembly in accordance with various embodiments.
Figure 3B:
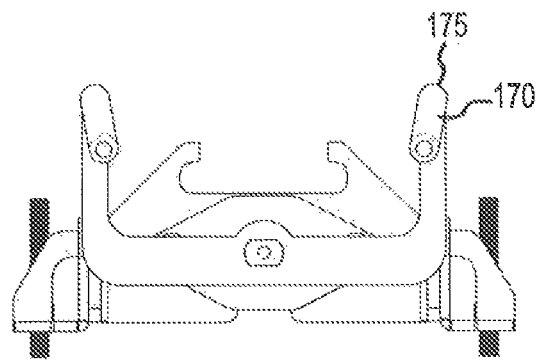
FIG. 3B depicts a front view of the pivoting guide track assembly of FIG. 3A in accordance with various embodiments.
Figure 3C:
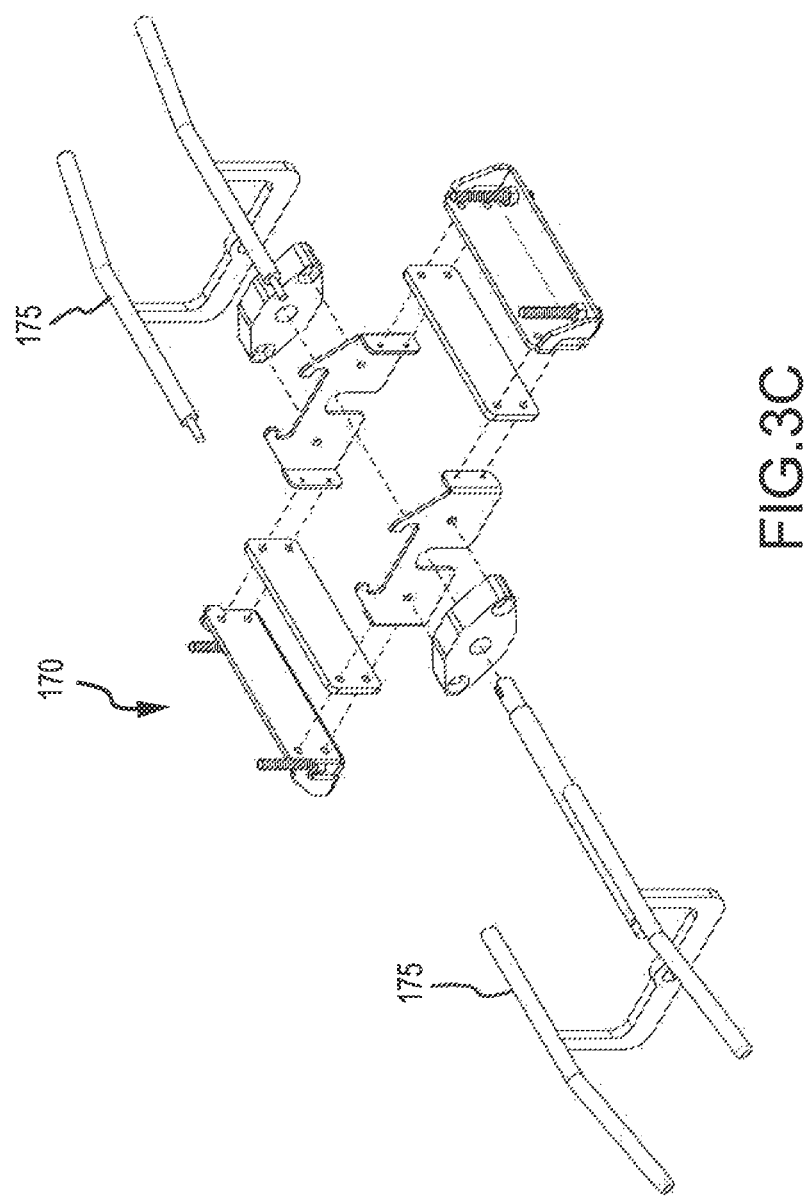
FIG. 3C depicts an exploded view of the pivoting guide track assembly of FIGS. 3A and 3B in accordance with various embodiments.

With reference to FIGS. 3A-3C, sorting system 100 may comprise multiple sets of substantially parallel stationary guide rails (not shown) between pivoting guide track system 170 locations. The orientation of the stationary guide rails and/or orientation of guide rails 175 of pivoting guide track system 170 may determine the orientation of each hinged member 130. Stated another way, each hinged member 130 may make contact with a portion of a stationary guide rail and/or a guide rail of 175 of pivoting guide track system 170, generally along a bottom surface of hinged member 130 near distal end 133, 135 of hinged member 130. Thus, in response to the pivoting guide track system 170 pivoting, each hinged member 130 making contact with pivoting guide track system 170, generally along guide rails 175, will pivot in kind. Depending on the orientation of a portion of the guide rails 175 of pivoting guide track system 170, adjacent hinged members 130 may pivot varying degrees. Pivoting guide track system 170 may be coupled to a controller and/or an actuator to move pivoting guide track system 170 as desired. For instance, the actuator may be commanded to pivot to either side of main sorting track 110 as desired. This may be via a single actuator to pivoting guide track system 170 to either side of main sorting track 110.

Figure 4:
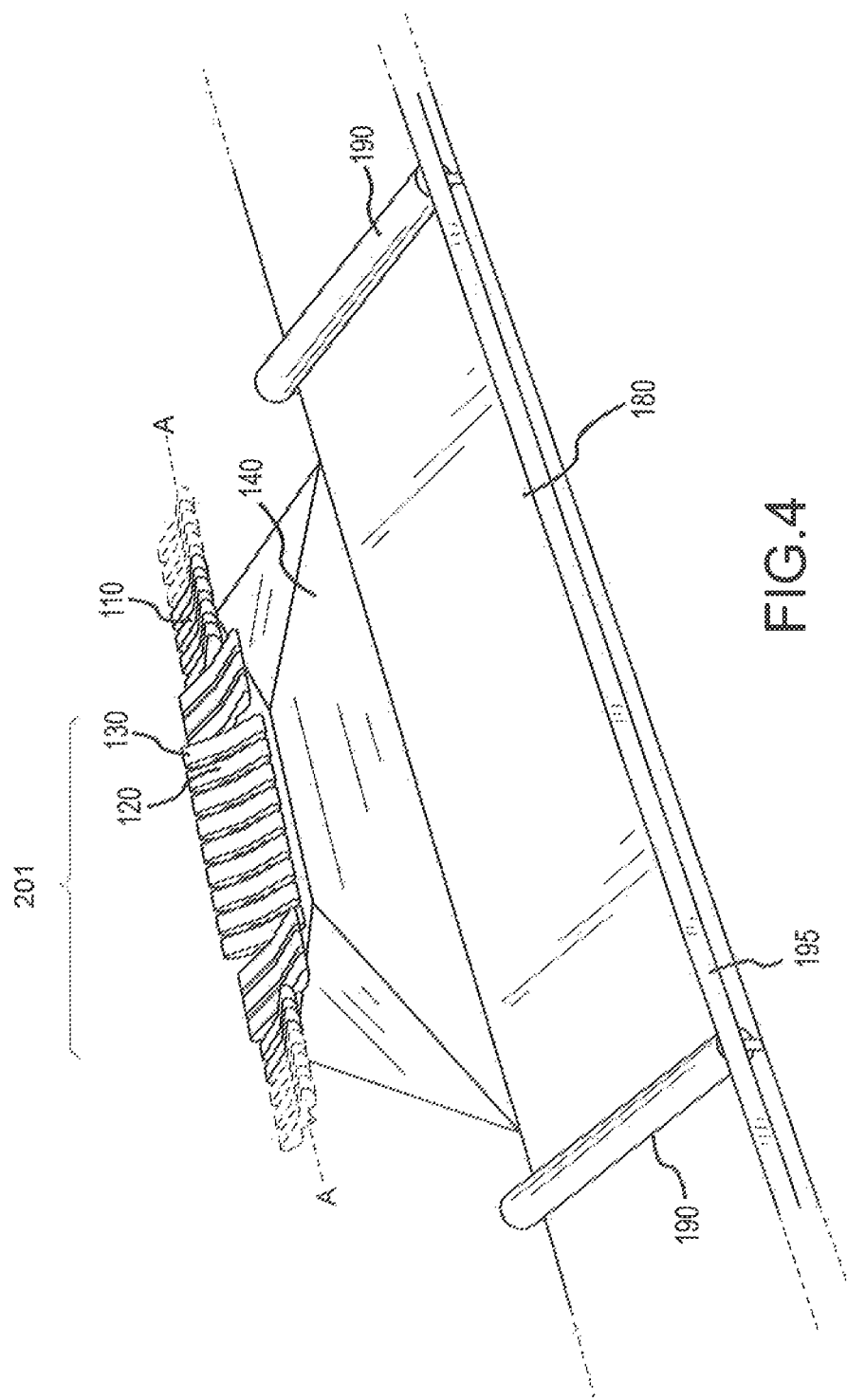
FIG. 4 depicts a plurality of hinged members working in tandem configured to deliver material from a main sorting track to a flanking conveyer belt in accordance with various embodiments.

According to various embodiments and with reference to FIG. 4, a plurality of hinged members 130 may pivot substantially in concert with pivoting guide track system 170. One or more pivoting guide track systems 170 are generally anchored in a fixed location along main sorting track 110. As depicted in FIG. 4, a plurality of hinged members 130 with top surfaces angled for delivering material down angled tray 140 are depicted. This angled orientation of hinged members 130 is in response to pivoting guide track system 170 pivoting and directing hinged members 130 within its span to move in kind. Material may roll from a position generally straddling one or more hinged members 130, generally towards the center 131 of one or more hinged members 130, down the top surface 120 of hinged member 130 onto and down angled tray 140 and to a secondary location, such as to flanking conveyor belt 180.

Figure 5B:
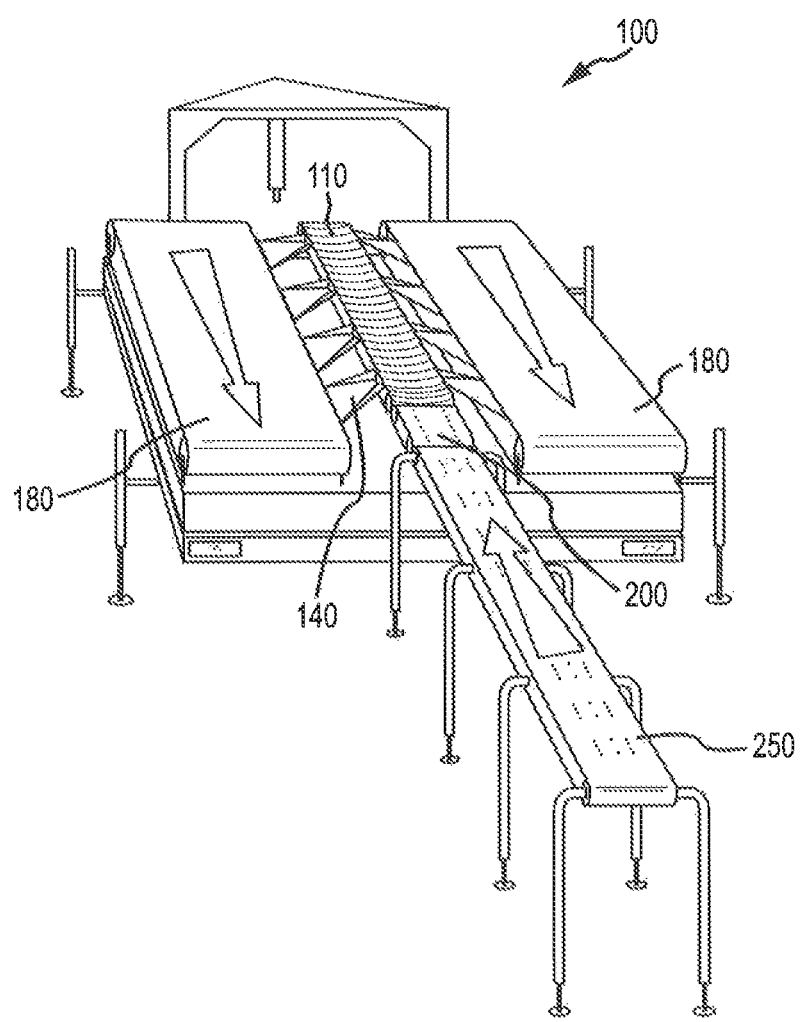
FIG. 5B depicts the relative operational directions of a sorting system in accordance with various embodiments.

According to various embodiments and with reference to FIGS. 5A-5B, an exemplary embodiment of sorting system 100 is depicted. Flanking conveyor belts 180 may be positioned adjacent to main sorting track 110. Flanking conveyor belts 180 may run the entire length of main sorting track 110 or a portion of main sorting track 110. One or more flanking conveyor belts 180 may be located on each side of main sorting track 110. Each flanking conveyor belt 180 of sorting system 100 may run in any desired direction. One or more movable partition 190 may establish a zone for sorted material to be delivered. A side wall 195 buttressing the edge of flanking conveyor belt 180 may retain material delivered between movable partitions 190 (See FIG. 4). For instance, each angled tray 140 may feed to a separate zone. The physical size of a zone size may be increased or decreased on demand based on the characteristics of the sorted material. This may be accomplished by moving movable partitions 190. For instance, material weighing within a particular band and/or being within a size band may be delivered to a designated zone. Multiple zones may be designated with the same characteristics. If a measured material does not match a designation it may be delivered to a catch-all zone. For instance, a watermelon of a certain size is expected to have an associated known weight band; however, if the size and weight do not correspond as expected, a problem with the watermelon may be assumed and it may be unsuitable for sale/packaging. These problem items may be directed to the catch-all zone for proper treatment.

According to various embodiments and with continued reference to FIG. 5A, a weighing belt 200 may be coupled to main sorting track 110. This coupling may be by positioning weighing belt 200 in close proximity to main sorting track 110 such that material may be transferred between the surfaces of weighing belt 200 and main sorting track 110 without intervention. A roll bar (not shown) positioned between weighing belt 200 and main sorting track 110 may assist the transfer of material between weighing belt 200 and main sorting track. Weighing belt 200 may sense that an object or material is on weighing belt 200 once the object enters a weighing area. This sensing may be by a sensor, such as a scale, load sensor, infrared sensing, proximity sensing, optical sensing and/or the like. Weighing belt 200 may measure the weight of the object or material to be sorted. This may be accomplished via a sensor such as a scale, load sensor, such as a pancake sensor and/or the like. Weighing belt 200 may store the calculated weight and/or transmit the data to a controller. A sizing bar (not shown) coupled to weighing belt 200 and/or near an end of main sorting track 110 may determine a size of the object or material. This sizing may be accomplished by the sizing bar establishing a plane through which an object and/or material to be sorted may pass through. Upon passing through the plane, sensors, such as optical sensors infrared sensors and/or the like, may determine a size of the object and/or material, such as by establishing a leading edge, a tailing edge, and/or width, of the object and/or material. An additional sensor near the end of main sorting track 110 adjacent weighing belt 200 may establish that an object or material has been delivered from weighing belt 200 to main sorting track 110. In this way, a hinged member 130 and/or group 201 of hinged members 130 may be identified as having an article of a determined size and/or weight on its/their surface. Preprogrammed logic may instruct main sorting track 110 to deliver the established group 201 of hinged members 130 to a predetermined location, such as the location of a pivoting guide track system 170 proximate a desired zone, associated with the measured band of size and/or weight.

At any point, such as when material is introduced from weighing track 200 to main sorting track 110, a new group 201 of hinged members 130 may be established. In one group 201, at a first sorting time delivering a first sorted material, a particular hinged member 130 may be the lead hinged member 130 in the group. In another group, the particular hinged member 130 which was previously the lead hinged member during the first sorting time, during a subsequent sorting activity, at a second sorting time delivering a second sorted material, may be a middle group member or be the tail of the group of hinged members 130.

According to various embodiments and with continued reference to FIG. 5B, delivery conveyor belt 250, weighing belt 200 and main sorting track 110 may operate in a first direction. Flanking conveyor belts 180 may operate in the opposite direction of delivery conveyor belt 250, weighing belt 200 and main sorting track 110.

Figure 6:
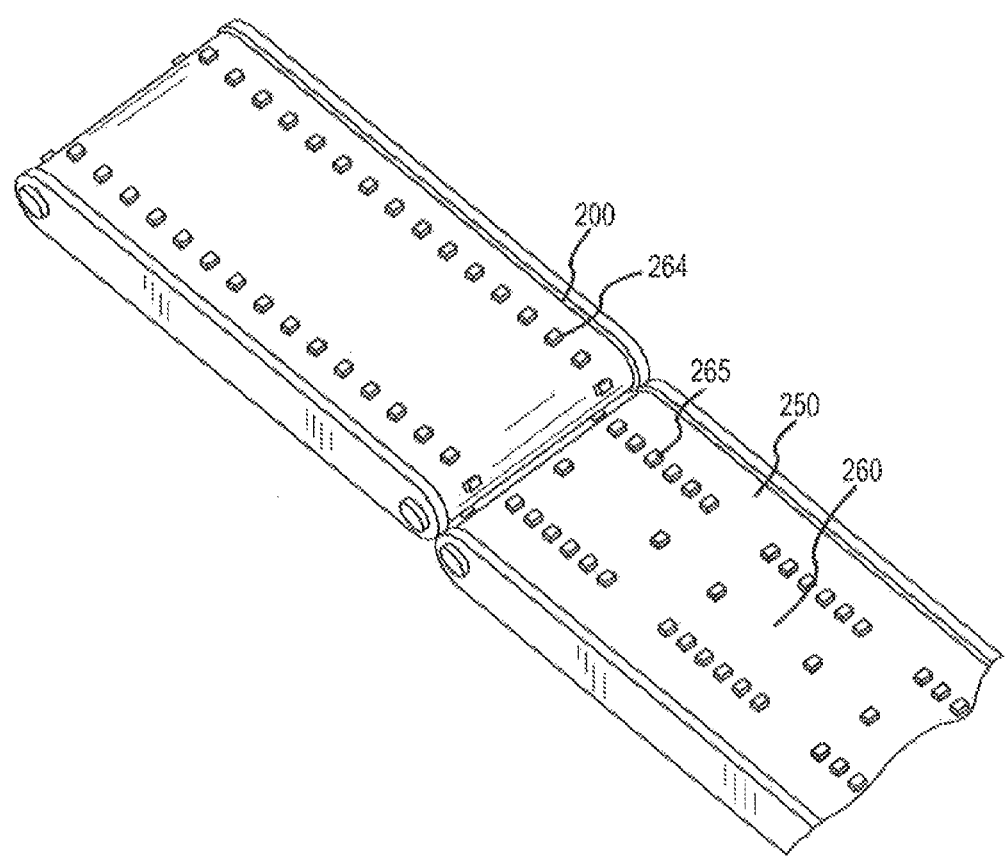
FIG. 6 depicts the interaction of a weighing belt and a delivery conveyor belt in accordance with various embodiments.

According to various embodiments and with reference to FIG. 6, weighing belt 200 may comprise a series of one or more raised tabs 264 coupled to the surface of weighing belt 200 to constrain an object to be weighed within a predetermined location. These raised tabs 264 similar to raised tabs 265 may comprise any shape; however, tabs 265 may comprise a rounded top and a substantially rectilinear prism base. Tabs 264 may be made from a material that will not adversely affect the sorting material upon contact between the sorting material and tab 264. Tabs 264 and/or 265 may be made of a rubber material. For instance, tabs 264 and/or 265 may be made from urethane 40A shore rubber material. Raised tabs 264 may be offset from tabs 265 so that they do not make contact with each other at the interface between weighing belt 200 and delivery conveyor belt 250. Weighing belt 200 and delivery conveyor belt 250 are generally positioned adjacent to each other with as little gap between as possible. According to various embodiments, the predetermined location to constrain an object to be weighed may be between a series of parallel lines of raised tabs 264. Though they may be made from any material, the raised tabs 264 may be made of deformable material.

According to various embodiments and with continued reference to FIG. 6, a delivery conveyor belt 250 may be coupled to and/or positioned adjacent to weighing belt 200. Delivery conveyor belt 250 may comprise targets 260 for worker to place material to be sorted within/on. Targets 260 may be indicated via markings, visual indicators and/or portioned areas. As depicted in FIG. 5A, a target 260 may be indicated and substantially outlined by raised tabs 265. This outline may substantially form a box to place material within. Targets 260 may both set a pace for a worker and determine an adequate amount of space between material to be sorted such that accurate sorting and sizing/weighing may be accomplished. According to various embodiments, the pace of the workers may be unrelated to the capability of sorting system 100.

According to various embodiments and with reference to FIGS. 7A-7B aspects of sorting system 100 may be mounted on a mobile platform. For instance, aspects of sorting system 100 may be mounted on a trailer for pulling behind a vehicle, such as a truck or tractor. In this way, sorting system 100 may be delivered to a location where sorting of material is desired, such as a growing field and set-up with little effort. For instance, flanking conveyor belts 180 and main sorting track 110 may be mounted on a trailer/mobile platform. Delivery conveyor belt 250 and/or weighing belt 200 (not shown in FIG. 7A or 7B) may be positioned in line with main sorting track 110 once moved to a convenient location such that sorting system 100 is ready for use. FIG. 7A depicts the trailer with its wheels removed and the sorting system 100 positioned in a stationary location for sorting. FIG. 7B depicts the mobile platform/trailer ready for transport. The mobile platform conforms to highway safety standards. For instance, the mobile platform may have breaks, such as breaks coupled to the breaking system of the towing vehicle, break lights, reflectors, rear impact guards/protection, warning indicators and the like.

In operation, in accordance with various embodiments, a mobile sorting system 100 may be delivered to a sorting site. This may be accomplished by hauling the mobile sorting system 100 behind a vehicle such a truck. Once delivered to the sorting site, the mobile sorting system 100 may be positioned for sorting. For instance, a weighing belt 200 may be positioned in-line with and in communication with a main sorting track 110. A delivery conveyor belt 250 may be positioned in-line with the main sorting track 110 and in-line with and in communication with the weighing belt 200. These may all be fixed in a semi-permanent location.

Weight and size designations of zones may be allocated in the system and/or according to preprogramed instructions specific to the material to be sorted. The delivery conveyor belt 250 may be turned on and may continuously operate in a direction towards main sorting track 110. Workers may position material to be sorted on/within targets 260 on delivery conveyor belt 250. Targets may be substantially outlined by raised tabs 265. These raised tabs 265 may comprise any shape; however, tabs 265 may comprise a rounded top and a substantially rectilinear prism base. Tabs 265 may be made of a rubber material. Targets may set a pace for a worker. For instance, a worker may position material to be sorted within/on each target 260, may place material to material to be sorted within/on every other target 260 or according to a pacing scheme. The pacing scheme and/or use of targets 260 may also enable the sorting system 100 to accurately measure the size and/or weight of material.

Delivery conveyor belt 250 may deliver its material to be sorted from within each target 260 to weighing belt 200. Weighing belt 200 may comprise raised tabs 264 to position material to be weighted. As material to be sorted enters a weighing location, the movement of the weighing belt 200 may be paused and a weight of the material may be made. A sensor may also sense the size of the material, such as by measuring the leading edge and/or the training edge of the material. These measurements may be stored to a control system and designated an item indicator. The control system may compare the size and/or weight against a look-up table to determine a delivery zone to deliver the material. For instance, the look-up table may have established bands of weight, such as between X and Y weight and/or bands of size, such as between x and y size for each zone. A zone may be partitioned between movable partitions 190.

Weighing belt 200 may deliver the material to the main sorting track 110. Once the material crosses a plane on the main sorting track 110 the control system may allocate a number of hinged members 130 for conveying the material to the determined delivery zone. This number of hinged members 130 may form a subset or group 201. The control system may allocate a particular hinged member 130 with the present location of the material as it crosses the plane. The control system may designate the particular hinged member 130 as center member of group 201. The movement of members of group 201 may be slaved together until material is delivered to the designated zone. In this way, the hinged members 130 of group 201 may be constantly changing based on when a material to be sorted is introduced onto main sorting track 110 and/or passes by a designated plane/sensor.

In this way, should the material slide or roll during transit, a buffer of group members trailing or leading the center of the group will aid in material delivery to the correct zone. According to various embodiments, the sorting system 100 may use a timer and knowledge of the speed of main sorting track 110 to determine location of the designated particular hinged member 130. The sorting system 100 may use the distance to designated pivoting guide track 170 associated with the correct delivery zone from the current location of the designated particular hinged member 130 for delivery purposes.

In response to the material arriving in-line with a pivoting guide track 170 associated with one or more zone the control system will pause the movement of main sorting track 110 and instruct the pivoting guide track 170 to pivot to a designated side of main sorting track 110 associated with the correct delivery zone. The passive group 201 of hinged members 130 will pivot as compelled by the tracks/guide rails 175 of pivoting guide track 170.

The material will slide and/or roll, unobstructed off of one or more of the hinged members 130 generally down angled tray 140, which forms a ramp to a secondary location. This secondary location may be a flanking conveyor belt 180 operating in a direction opposite the direction of the main sorting track 110. In this way, space that would be difficult to use towards the origin of the main sorting track 110 may be utilized as sorted material is brought from a distal end of main sorting track 110 back towards end of main sorting track 110 adjacent the weighing belt 200. Thus, the entire span may be utilized. Also, these flanking conveyor belts 180, which may flank both sides of main sorting track 110, may direct material within the zones to a location where a worker is located. The worker may then package and/or box the material in one or more the zones. Boxes may be located on rails above or near each sorting zone for convenience.

The present system does not apply a direct force on the items to be sorted. Instead gravity is used to deliver materials to designated zones. Stated another way, no trip member, ram or ejector is utilized to deliver material to a designated zone. The parts that comprise main sorting track 110 are simple in design and comprise few, such as three or less moving pieces. This extends the operational life of main sorting track 110.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. For instance, aspects of the systems described herein may be applicable to devices for sorting, separating, and the like. Furthermore, those skilled in the art having read this disclosure will recognize that changes and modifications may be made to the exemplary embodiments without departing from the scope of the present invention. These and other changes or modifications are intended to be included within the scope of the present invention, as expressed in the following claims.

The sorting system 100 may be programmed sort a batch of different types of materials such as types of fruit and/or vegetables. The sorting system 100 may be programmed pivot one or more groups of hinged member 130, such as at two pivoting guide track system 170 locations, substantially simultaneously.

As used herein "passive" may relate to needing to be influenced and/or acted upon in order to move. According to various embodiments, hinged member 130, pivot structure 145 and/or anchor chain 147 may be passive elements. Thus, the present sorting system 100 does not comprise a motor and/or actuator coupled to each hinged member 130; however, each hinged member 130 may be moved if acted upon.

As variously described herein, a conveyor belt may comprise two or more pulleys and/or motors, with a continuous loop coupling of elements or material that rotates about the pulleys. One or both of the pulleys may be powered, moving the belt and the material on the belt forward. The powered pulley is called the drive pulley while the unpowered pulley is called the idler. Flanking conveyor belts 180, delivery conveyor belt 250, weighing belt 200 and main sorting track 110 may all comprise aspects of conveyor belts.

In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the embodiments are directed toward one or more computer systems and/or controllers capable of carrying out the functionality described herein. The computer system may include one or more processors. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

The computer systems disclosed herein also includes a main memory, such as for example random access memory (RAM), and may also include a secondary memory. The secondary memory may include, for example, a removable storage drive/unit. As will be appreciated, the removable storage unit includes a non-transitory computer usable storage medium having stored therein computer software and/or data.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more."

The invention claimed is:

1. A sorting system comprising:
a main sorting track comprising a plurality of hinged members, wherein a subset of said plurality of hinged members passively pivot to deliver sorted material to a location on either side of the main sorting track, wherein each hinged member of the plurality of hinged members may pivot to either side of the main sorting track, wherein the subset of the plurality of hinged members, which are configured to work in tandem, is determined based on at least one of the sensed leading edge of a material to be sorted and a sensed trailing edge of the material to be sorted, wherein the subset of the plurality of hinged members are slaved together via programing based on at least one of the sensed leading edge of the material to be sorted and the sensed trailing edge of the material to be sorted.

2. The sorting system of claim 1, wherein each hinged member of the plurality of hinged members is coupled to a pivot structure at a single pivot location.

3. The sorting system of claim 2, wherein the pivot structure is coupled to an anchor chain structure, wherein adjacent anchor chain structures are coupled together to form a drive belt.

4. The sorting system of claim 1, further comprising stationary guide rails to orient a position of each hinged member of the plurality of hinged members.

5. The sorting system of claim 4, further comprising a pivoting guide track system to orient each hinged member of said subset of the plurality of hinged members in a pivoted orientation.

6. The sorting system of claim 5, wherein the pivoting guide track system is fixed in a stationary position along the main sorting track.

7. The sorting system of claim 1, wherein the hinged members comprise an elongated V shaped top surface.

8. The sorting system of claim 1, wherein the sorting system is configured to sort materials based on at least one of a size and a weight of the material.

9. The sorting system of claim 1, further comprising a flanking conveyor belt adjacent to a side of the main sorting track.

10. The sorting system of claim 9, wherein said flanking conveyor belt operates in an opposite direction than the direction of operation of the main sorting track.

11. The sorting system of claim 9, wherein the main sorting track and the flanking conveyor belt are mounted on a mobile platform configured to be towed by a vehicle.

12. The sorting system of claim 1, further comprising a delivery conveyor belt in line with and in communication with the main sorting track, wherein the delivery conveyor belt comprises targets for placing materials to be sorted.

13. The sorting system of claim 12, wherein the targets are outlined by a series of raised deformable tabs.

14. The sorting system of claim 1, wherein a sensor senses the leading edge and the trailing edge of the material to be sorted.

15. A mobile sorting system comprising;
a main sorting track comprising a plurality of hinged members, wherein a subset of the plurality of hinged members deliver sorted material to a location on either side of the main sorting track via passively pivoting on an axis, wherein each hinged member of the plurality of hinged members may pivot to either side of the main sorting track, wherein a subset of the plurality of hinged members, which are configured to work in tandem, is determined based on at least one of a sensed leading edge of a material to be sorted and a sensed trailing edge of the material to be sorted, wherein the subset of plurality of hinged members are slaved together via programing based on at least one of the sensed leading edge of the material to be sorted and the sensed trailing edge of a material to be sorted; and
a mobile platform, wherein the main sorting track is integrally coupled to the mobile platform.

16. The mobile sorting system of claim 15, wherein the mobile platform is configured to be towed by a vehicle.

17. The mobile sorting system of claim 15, further comprising a flanking conveyor belt integrally coupled to the mobile platform, wherein the flanking conveyor belt is located adjacent to a side of the main sorting track.

* * * * *